United States Patent [19]
Yoshida et al.

[11] Patent Number: 5,865,865
[45] Date of Patent: Feb. 2, 1999

[54] PROCESS FOR PRODUCTION OF GLASS SUBSTRATE COATED WITH FINELY PATTERNED NESA GLASS MEMBRANE

[75] Inventors: Gohei Yoshida, Nara; Toshio Minamigawa, Osaka; Johji Matsumura, Okayama, all of Japan

[73] Assignee: Honjo Sorex Co., LTD, Okayama, Japan

[21] Appl. No.: 516,774

[22] Filed: Aug. 18, 1995

[30] Foreign Application Priority Data

Aug. 18, 1994 [JP] Japan .................................. 6-194065

[51] Int. Cl.⁶ ................................................ C03C 17/245
[52] U.S. Cl. .......................... 65/60.2; 65/60.52; 427/109; 427/166; 427/255.2; 427/255.3; 427/282
[58] Field of Search .............................. 65/24, 60.2, 60.3, 65/60.5, 60.51, 60.52, 60.53; 427/166, 109, 282, 255.2, 255.3

[56] References Cited

U.S. PATENT DOCUMENTS

| | | | |
|---|---|---|---|
| 3,615,465 | 10/1971 | Bullinger | 430/313 |
| 4,187,336 | 2/1980 | Gordon | 428/34 |
| 4,368,230 | 1/1983 | Mizukami et al. | 428/203 |
| 4,608,129 | 8/1986 | Tamamura et al. | 204/18.1 |
| 4,696,837 | 9/1987 | Lindner | 427/255.3 |
| 4,788,079 | 11/1988 | Lindner | 427/166 |
| 4,948,706 | 8/1990 | Sugihara et al. | 430/311 |
| 5,503,732 | 4/1996 | Miyazaki et al. | 205/122 |
| 5,503,952 | 4/1996 | Suzuki et al. | 430/7 |

FOREIGN PATENT DOCUMENTS 0158399 10/1985 European Pat. Off. .
63-310513 12/1988 Japan .

OTHER PUBLICATIONS

EPO Search Report, Jul. 1996.
Patent Abstract of Japan –JP 63310513 Dec. 1988.
Patent Abstract of Japan –JP 61236634 Oct. 1986.
Patent Abstract of Japan –JP 1045006 Feb. 1989.
Derwent Publications Ltd., London, GB; JP B 52 028 809 (Abstract) Jul. 1977.

*Primary Examiner*—Karen M. Hastings
*Assistant Examiner*—Sean Vincent
*Attorney, Agent, or Firm*—Jacobson, Price, Holman & Stern, PLLC

[57] ABSTRACT

A process for production of a glass substrate coated with a patterned Nesa glass membrane which comprises, in sequence:

the first step of coating a photoresist on a glass substrate to form a photoresist membrane, exposing the membrane to electromagnetic waves through a mask and then developing the photoresist to form a patterned photoresist membrane on the glass substrate;

the second step of forming a Nesa glass membrane on the entire surface of the glass substrate thus provided with the patterned photoresist membrane; and the third step of removing the patterned photoresist membrane together with the Nesa glass membrane thereon from the glass substrate to leave a patterned Nesa glass membrane on the glass substrate.

4 Claims, No Drawings

PROCESS FOR PRODUCTION OF GLASS SUBSTRATE COATED WITH FINELY PATTERNED NESA GLASS MEMBRANE

BACKGROUND OF THE INVENTION

1. Field of the Invention

This invention relates to a process for production of a glass substrate coated with a filnely patterned Nesa glass membrane or a transparent and electroconductive inorganic tin oxide film having a fine pattern on a glass substrate. The glass substrate coated with a finely patterned Nesa glass membrane is especially suitable for use as a flat panel in liquid crystal displays or plasma displays.

2. Description of Prior Art

Various processes are already known for the production of a glass substrate coated with a finely patterned Nesa glass membrane, among which is an etching process wherein a Nesa glass membrane is formed on the entire surface of a glass substrate by, for example, a spraying method; a metal mask or a photoresist mask is formed on the Nesa glass membrane; and then a pattern is formed by etching and removing the membrane according to the pattern, as is disclosed in Japanese Patent Application Laid-open No. 56-94542, No. 63-65090 or No. 63-171886.

According to this process, a pattern can be formed with high accuracy of about 30 $\mu$m in line width or line separation, however, there is needed nascent hydrogen to effect the etching, and hence a concentrated mineral acid such as concentrated hydrochloric acid is needed. Thus, the method is not suitable for pratical use.

There is also known a lift off process wherein a glass substrate is masked with a masking paste by screen process printing; a Nesa glass membrane is formed thereon; and then the masking paste is washed and removed to leave a patterned Nesa glass membrane on the glass substrate. This process is simple and convenient, however, based on a limited fineness of the screen used and the viscosity of the paste has, the process has had a limit of accuracy of about 80 $\mu$m in line width or line separation.

SUMMARY OF THE INVENTION

It is, therefore, an object of the invention to provide a process for production of a glass substrate coated with a finely patterned Nesa glass membrane with improved accuracy in line width or line separation of not more than 30 $\mu$m in a simple and inexpensive manner by a lift off process wherein a photoresist is used, with making use of the merits of both the etching process and the lift off process.

According to the invention, there is provided a process for production of a glass substrate coated with a patterned Nesa glass membrane which comprises, in sequence:
  the first step of coating a photoresist on a glass substrate to form a photoresist membrane, exposing the membrane to electromagnetic waves through a mask and then developing the photoresist to form a patterned photoresist membrane on the glass substrate;
  the second step of forming a Nesa glass membrane on the entire surface of the glass substrate thus provided with the patterned photoresist membrane; and
  the third step of removing the patterned photoresist membrane together with the Nesa glass membrane thereon from the glass substrate to leave a patterned Nesa glass membrane on the glass substrate.

DESCRIPTION OF PREFERRED EMBODIMENTS

The process of the invention will now be set forth in detail in order of the steps. In the first step of the process of the invention, a photoresist is coated on a glass substrate to form a photoresist membrane thereon, the photoresist membrane is exposed to electromagnetic waves such as ultraviolet rays, electron rays or X-rays through a patterned mask, and then the photoresist membrane is developed to form a patterned photoresist membrane on the glass substrate.

It is preferred that a silica-coated glass substrate is used as a glass substrate to prevent alkalis from separating from the glass substrate.

The photoresists are divided into two types, namely, a positive one and a negative one. Either type may be used in the invention, however, an o-quinonediazide type positive photoresist is in particular preferred. The photoresists inclusive of the o-quinoneadizide type positive photoresist are already well known in the art, as set forth in Nagamatsu et al., "Photosensitive Polymers", Kodansha (1977).

The o-quinonediazide type positive photoresist is usually composed of o-naphthoquinonediazide dissolved in an alkali-soluble resin such as a novolak resin. As well known, o-naphthoquinonediazide generates a carboxyl group in the molecule when it is exposed to electromagnetic waves such as ultraviolet rays. Accordingly, when the photoresist is exposed to ultraviolet rays, the exposed portion has a larger solubility in an alkaline solution, so that the exposed portion is removed by an alkaline solution. That is, the photoresist is developed with an alkaline solution. The o-quinonediazide type positive photoresist is on the market such as OFPR 800 available from Tokyo Ohka Kogyo K.K. or ZPP 1700 available from Nippon Zeon K.K.

The photoresist may be coated on a glass substrate by any known method such as by spin coating or roll coating. The latter method is advantageous to mass production.

As set forth hereinafter, a Nesa glass membrane is formed on the entire surface of the glass substrate preferably by a chemical vapor deposition (CVD) process under normal pressure from the standpoint of the cost of equipment and production. During the normal pressure CVD process, the temperature of the glass substrate reaches usually as high as about 500° C., hence it is preferred that the photoresist membrane is so formed as has a thickness of not less than about two microns, more preferably, not less than about three microns, so that the photoresist membrane is not carbonized or burnt out during the CVD process.

Then, in the second step, as above mentioned, a Nesa glass membrane is formed on the entire surface of the glass substrate provided with the patterned photoresist membrane preferably by the normal pressure CVD process. More specifically, the glass substrate having the patterned photoresist membrane thereon is placed in a CVD furnace in which a gas mixture of a vaporized tin compound and a dopant is blown upon the glass substrate through a slit nozzle, thereby forming a Nesa glass membrane on the entire surface of the glass substrate.

In more detail, a solution of a tin compound and a dopant is prepared and heated in a heating pot provided with a normal pressure CVD apparatus to produce a vapor of the tin compound and the dopant, and the vapor is then introduced into the CVD apparatus, or alternatively, there are prepared each solution of a tin compound and of a dopant, each solution is heated and vaporized, and then the resultant vapor is introduced into the CVD apparatus. Then the vapor is blown upon a heated glass substrate where the tin compound and the dopant are thermally decomposed to form a transparent and electroconductive tin oxide membrane doped with the dopant on the glass substrate. The normal pressure CVD process is a known process for the preparation of Nesa glass membrane.

In the process of the invention, a continuous CVD process is preferably employed. A preferred process is carried out as follows. As mentioned hereinbefore, a patterned photoresist membrane is formed on a glass substrate, and then the glass substrate is fed into a CVD apparatus with a belt while the running speed of the belt and the temperature of the glass substrate are appropriately arranged so that the patterned photoresist membrane is not carbonized or burnt out during the CVD operation. According to the invention, the glass substrate is heated to a temperature usually of not less than 400° C., preferably to a temperature of 480°–520° C., i.e., a temperature a little smaller than the temperature at which the photoresist is carbonized or burnt out.

The material for the preparation of Nesa glass membrane is a tin compound and a dopant. The tin compound usable includes, for example, stannic chloride, dimethyltin dichloride, monomethyltin trichloride or tetramethyltin, while the dopant usable includes, for example, antimony trichloride, hydrogen fluoride, bromotrifluoromethane or trifluoroacetic acid.

In particular, the use of a tin compound selected from dimethyltin dichloride and monomethyltin trichloride together with trifluoroacetic acid as a dopant is preferred since these materials provide a solution easily which are readily usable in the continuous normal pressure CVD process and provide a Nesa glass membrane which is highly electro-conductive and transparent. The solution is prepared preferably by use of water or a lower aliphatic alcohol such as methanol or a mixture of these.

According to the invention, it is preferred that a Nesa glass membrane is formed on the glass substrate by a continuous normal pressure CVD process as above set forth.

However, the Nesa glass membrane may be formed by any process other than the normal pressure CVD process. For instance, an aqueous solution is prepared by dissolving stannic chloride tetrahydrate in water and then either antimony trichloride (dopant) together with concentrated hydrochloric acid or trifluoroacetic acid (dopant) and the solution thus prepared is sprayed on a glass substrate in a CVD furnace. This process is called a spray process and is set forth in, for example, "Thin Film Technology Handbook" ed. by The Japan Society for the Promotion of Science, The 131th Committee (1983). Further, the Nesa glass membrane may be formed by other processes, for example, by a CVD process under reduced pressure, a laser CVD process, a spattering process, an ion plating process or a plasma CVD process.

In the third step of the process of the invention, the patterned photoresist membrane is removed from the glass substrate together with the Nesa glass membrane formed on the patterned photoresist membrane.

The patterned photoresist membrane can be removed by immersing the glass substrate in an aqueous solution of an alkali, for example, in a 3–5% by weight aqueous solution of sodium hydroxide or potassium hydroxide, if necessary under heating at 30°–100° C. , preferably 40°–80° C. The o-quinoneadizide type photoresist membrane can be in particular readily removed from the glass substrate by the above mentioned immersion method,thereby to form a Nesa glass membrane finely patterned with high accuracy.

Thus, according to the process of the invention, the Nesa glass membrane is left on the glass substrate where the photoresist has been exposed to electromagnetic waves and thus removed by the development with an aqueous alkaline solution in the first step, thereby forming a pattern on the glass substrate. The results are the same as the photomechanical process wherein a negative photoresist is used.

The invention will now be described in more detail below in which an o-quinonediazide positive type photoresist was used which was available from Tokyo Ohka Kogyo K.K. as OFPR 800 or available from Nippon Zeon K.K. as ZPP 1700.

EXAMPLE 1

A glass substrate having a silica coating on the surface was cleaned and then a positive type photoresist was coated thereon to form an even membrane about two to three microns thick. The photoresist membrane was exposed to ultraviolet rays through a patterned mask and the photoresist was developed with an aqueous alkaline solution thereby to form a patterned photoresist membrane on the glass substrate.

A CVD apparatus was arranged so that the glass substrate was heated to a temperature in the range of 480°–520° C. under a slit nozzle from which vapor of a tin compound and a dopant was blown out.

An amount of 100 parts by weight of antimony trichloride was dissolved in an aqueous solution composed of 850 parts by weight of concentrated hydrochloric acid and 250 parts by weight of water. A varied amount (30–150 parts by weight) of the thus prepared solution was added to an aqueous solution of 550 parts by weight of dimethyltin dichloride in 500 parts by weight of water to prepare a solution for CVD process.

The solution was fed into a container heated at about 300° C. with a pump to evaporate the solution instantaneously, and the resultant vapor was blown out of the slit nozzle upon the glass substrate to form a Nesa glass membrane on the entire surface of the glass substrate inclusive of the patterned photoresist membrane.

The glass substrate was then immersed in a 5% by weight of aqueous solution of sodium hydroxide at 50° C. for 5 minutes to remove the patterned photoresist membrane together with the Nesa glass membrane thereon to leave a patterned Nesa glass membrane on the glass substrate.

Except where a photoresist membrane was formed on the glass substrate, a Nesa glass membrane was formed directly on the entire surface of the silica-coated glass substrate in the same manner as above described.

Table 1 shows a surface resistivity and light transmittance at a wavelength of 550 nm of the thus prepared Nesa glass membrane on the glass substrate in relation to the amount of the antimony trichloride in the solution for the CVD process. The surface resistivity is a resistance between the two opposing electrodes on a unit surface area (1 $m^2$) of an insulating material ("Revised Electric Terms Dictionary", Corona K.K. (1975)). In other words, the surface resistivity is a resistance between the opposing sides of a sheet resistor in the form of regular square. When the resistance distribution is uniform, the surface resistivity is not related with the size of the sheet.

The surface resistivity and transmittance change not only according to the composition of the solution for CVD process but also according to the amount of the vapor fed into the CVD apparatus. The relation of the composition of the solution for the CVD process and the amount of the vapor of the solution fed into the CVD apparatus to the resultant surface resistivity of the Nesa glass membrane can be determined empirically. Thus a Nesa glass membrane having a desired surface resistivity can be prepared based on the empirical results thus obtained.

The Nesa glass memrane prepared according to the process of the invention has a surface resistivity usually in the range of several tens to several hundred Ω/square and has a fine pattern of accuracy of about 25 μm in line width or line separation.

TABLE 1

| Amount of SbCl$_3$ (parts by weight) | Surface Resistivity (Ω/square) | Transmittance (%) |
|---|---|---|
| 49 | 280 | 74 |
| 74 | 150 | 76 |
| 92 | 110 | 82 |

EXAMPLE 2

An amount of 500 parts by weight of dimethyltin dichloride was dissolved in 500 parts by weight of water, and then a varied amount (20–100 parts by weight) of trifluoroacetic acid according to a required surface resistivity of the resultant Nesa glass membrane. A patterned Nesa glass membrane was prepared in the same manner as in Example 1.

Table 2 shows a surface resistivity and transmittance at a wavelength of 550 nm of the thus prepared patterned Nesa glass membranes on the glass substrate in relation to the amount of the trifluoroacetic acid in the solution for the CVD process.

TABLE 2

| Amount of CF$_3$COOH (parts by weight) | Surface Resistivity (Ω/square) | Transmittance (%) |
|---|---|---|
| 43 | 310 | 85 |
| 54 | 290 | 84 |
| 76 | 180 | 82 |
| 98 | 150 | 80 |

In common with Example 1, the relation of the composition of the solution for the CVD process and the amount of the vapor of the solution for the CVD process fed into the CVD apparatus to the resultant surface resistivity of the Nesa glass membrane can be determined empirically, so that a Nesa glass membrane having a desired surface resistivity can be prepared based on the empirical results.

Thus, a Nesa glass membrane can be prepared according to the invention which has a surface resistivity in the range of several tens to several hundred Ω/square and has a fine pattern of the same accuracy as Example 1.

What is claimed is:

1. A process for production of a glass substrate coated with a patterned Nesa glass membrane which comprises the steps of, in sequence:

the first step of coating a photoresist on a glass substrate to form a photoresist membrane, exposing the membrane to electromagnetic waves through a mask and then developing the photoresist to form a patterned photoresist membrane on the glass substrate;

the second step of forming a Nesa glass membrane on the entire surface of the glass substrate thus provided with the patterned photoresist membrane, wherein the Nesa glass membrane is formed on the glass substrate by a chemical vapor deposition process wherein the glass is heated and either (a) an aqueous solution of dimethyltin dichloride or monomethyltin trichloride in water containing trifluoroacetic acid or (b) an aqueous solution of dimethyltin dichloride or monomethyltin trichloride in a mixture of water and hydrochloric acid containing antimony trichloride is fed into a heated container and heated to evaporate instantaneously, and the resultant vapor is blown upon the heated glass substrate, thereby, to form a Nesa glass membrane on the glass substrate; and the third step of removing the patterned photoresist membrane together with the Nesa glass membrane thereon from the glass substrate to leave a patterned Nesa glass membrane on the glass substrate.

2. A process as claimed in claim 1 wherein the glass substrate has a coating of silica on the surface.

3. A process as claimed in claim 1 wherein the photoresist is a positive type one and is such that it is developed with an aqueous alkaline solution after it is exposed to electromagnetic waves.

4. A process as claimed in claim 1 wherein the electromagnetic waves are ultraviolet rays.

* * * * *